United States Patent [19]

Gruber

[11] Patent Number: 4,898,602
[45] Date of Patent: Feb. 6, 1990

[54] SELECTIVELY OPENABLE FILTERING ASSEMBLY

[76] Inventor: Thomas J. Gruber, 6805 Mayfield Rd., Bldg. B, Ste. 1114, Mayfield Heights, Ohio 44124

[21] Appl. No.: 174,100

[22] Filed: Mar. 28, 1988

[51] Int. Cl.$^4$ .......................................... B01D 46/00
[52] U.S. Cl. ...................................... 55/359; 55/498; 55/473; 220/359
[58] Field of Search .............. 55/359, 274, 139, 387, 55/473; 220/359, 260, 211, 265, 201; 292/201, 134; 219/201, 243

[56] References Cited

U.S. PATENT DOCUMENTS

| | | | |
|---|---|---|---|
| 2,138,874 | 12/1938 | Myers | 55/518 |
| 2,764,251 | 9/1956 | Jessop | 55/316 |
| 2,809,715 | 10/1957 | Lemkey | 55/486 |
| 2,877,921 | 3/1959 | Grim | 220/211 |
| 3,360,120 | 12/1967 | Getzin | 55/359 |
| 3,521,630 | 4/1967 | Westberg et al. | 128/146.6 |
| 3,650,269 | 3/1972 | Curtis | 128/212 |
| 3,727,769 | 11/1973 | Scholl | 210/484 |
| 4,271,834 | 6/1981 | Tanaka | 128/205.27 |
| 4,337,767 | 7/1982 | Yahata | 128/206.28 |
| 4,373,635 | 2/1983 | Mules | 206/525 |
| 4,382,440 | 5/1983 | Kapp et al. | 128/201.25 |
| 4,428,907 | 1/1984 | Heijenga et al. | 422/61 |
| 4,503,851 | 3/1985 | Braunroth | 128/203.29 |
| 4,579,113 | 4/1986 | McCreadie et al. | 128/202.13 |
| 4,665,309 | 5/1987 | Derbyshin | 220/359 |
| 4,778,496 | 10/1988 | Conrad | 55/473 |
| 4,783,206 | 11/1988 | Cullen | 55/274 |

FOREIGN PATENT DOCUMENTS

| | | | |
|---|---|---|---|
| 65432 | 5/1980 | Japan | 220/211 |
| 247865 | 2/1926 | United Kingdom | 55/274 |

*Primary Examiner*—Bernard Nozick
*Attorney, Agent, or Firm*—Fay, Sharpe, Beall, Fagan, Minnich & McKee

[57] ABSTRACT

A selectively openable filtering assembly includes a filter member for treating a fluid passing therethrough and a cover member for sealing the filter member against communication with the environment. A remotely activated device is provided for opening the cover member to expose the filter member to the environment when it is desired to use the filter member.

22 Claims, 7 Drawing Sheets

SELECTIVELY OPENABLE FILTERING ASSEMBLY

BACKGROUND OF THE INVENTION

This invention generally pertains to filtering assemblies. More specifically, the present invention relates to a selectively openable filtering assembly.

The invention is particularly applicable to a remotely openable filter member which treats contaminated air passing therethrough. However,. it will be appreciated by those skilled in the art that the invention has broader applications and may be useful also in a means for remotely opening a filter in other filtering environments where a filter is used to treat gases or liquids. More broadly, the means for remotely opening a package may find many uses outside the filtering environment as well.

Charcoal filters are typically used in breathing apparatus for fire fighters, miners, soldiers in the field, etc. Because the breathing apparatus is, typically, only used in emergency situations, it may be stored on the shelf for long periods of time. When it comes time to use the breathing apparatus, it may be found that the charcoal granules constituting the filtering medium have been rendered ineffective due to an extended period of exposure to the atmosphere. Typically, moisture and other constituents in the atmosphere will react adversely with the activated charcoal in the filter, causing the charcoal granules in the filter to lose their desirable adsorption properties.

In many different types of industrial environments, it is necessary for a worker to wear some type of respirator to avoid breathing the contaminated air of the work environment. To this end, different types of respirators have been devised for providing the worker with uncontaminated breathing air. For this type of respirator, generally no protection is necessary for the air cleaning element since it is continually in use during the workday.

Even for a breathing apparatus which is used only intermittently, there have been designed filter elements which are protected from the environment by a cover which is manually removable such as by pulling a pull tab, a corner, a string, or the like. However, under certain circumstances, the filtration element or filter unit of a breathing device or respirator is .not accessible for the removal of such a covering element thereon absent the disassembly of the respirator in question. This is particularly the case in respirators which have a built-in filtering unit or filter member. In an emergency situation, there may not be time to disassemble the respirator apparatus so as to have access to the filter unit itself in order that any protective covering on the filter unit can be removed thereby allowing air to flow through the filter.

Another environment in which filter units are generally inaccessible is in a survival shelter adapted for use as a place of refuge during warfare, industrial accidents, earthquakes, terrorism, or sabotage and the like. Such conventional shelters are provided with various filtration devices for filtering the air of the environment such as the so called "NBC" (nuclear, biological, chemical) filtration devices. These devices generally house a filtration cartridge, which may be an activated charcoal cartridge or the like, for filtering the air which is allowed to enter the shelter. The filter cartridge is generally inaccessible without a disassembly of the entire filter mechanism. In an emergency, however, there will generally not be enough time to disassemble the filtration mechanism to have access to the filter unit itself in order that any protective covering on the filter unit can be removed.

Additionally, it may be advantageous in certain industrial environments, such as petrochemical plants, nuclear power stations, ammunition manufacturing plants, various types of mines and the like, whether for the supply of air or other fluids, to provide a filter assembly which is protected by a cover from communication with its environment until needed and in which there is provided a remotely activated means for quickly opening the cover, in order to expose the filter medium to communication with fluids in the environment, without needing direct access to the filter assembly.

Accordingly, it has been considered desirable to develop a new and improved means for selectively opening a package such as a filter assembly by remote control and a heat severing means for a package cover material which would overcome the foregoing difficulties and others and meet the above-stated needs while providing better and more advantageous overall results.

BRIEF SUMMARY OF THE INVENTION

In accordance with the present invention, a new and improved selectively openable filtering assembly is provided.

More particularly in accordance with the invention, the assembly comprises a filter means for treating a fluid passing therethrough and a cover means for sealing the filter means against communication with the environment. A remotely activated means is provided for opening the cover means to expose the filter means to the environment when it is desired to use the filter means.

In accordance with another aspect of the invention, the filter means comprises a filtering medium and a support frame for supporting the filtering medium. In one embodiment, the support frame comprises four side walls as well as top and bottom end walls with the end walls being perforated. In another embodiment, the support frame is toroidally shaped and includes inner and outer end walls which are perforated.

In accordance with still another aspect of the present invention, the cover means comprises a layer of plastic material.

In accordance with yet another aspect of the invention, the means for opening comprises an electrically conductive layer which is adhered to the cover means and a means for providing electricity to the electrically conductive layer. In one embodiment, the electrically conductive layer comprises a metallic foil strip. In another embodiment, the electrically conductive layer comprises a conductive polymer layer. In still another embodiment, the electrically conductive layer comprises a conductive paint layer.

In accordance with still another aspect of the present invention, the cover means comprises a cover layer and a means for biasing the cover layer such that the cover layer will roll up after the electrically conductive layer melts an adjacent portion of the cover layer.

According to yet another aspect of the invention, the cover means comprises a cover layer and an elastic band held in tension for biasing the cover layer after the electrically conductive layer melts the adjacent cover layer.

In accordance with another aspect of the invention, an emergency air filtering apparatus is provided which comprises a filter means for cleaning a contaminated air passing therethrough and a cover means for sealing the filter means against communication with the environment. A fan means is provided for urging contaminated air through the filter means. A housing means holds the filter means, the cover means, and the fan means. A remotely activated means is provided for opening the cover means to expose the filter means to the environment when it is desired to use the filter means without having to disassemble the housing means to obtain access to the filter means held therein.

In accordance with still another aspect of the invention, a remotely openable assembly is provided. More particularly, the assembly comprises a container having contents and a cover means for sealing said container contents against communication with the surrounding environment. A remotely activated means is provided for opening the cover means in order to allow the contents of the container to communicate with the surrounding environment.

According to another aspect of the invention, a method is provided for opening a container which is sealed against the environment. The method includes the step of providing a container having contents, with a sealing layer being provided on the container to prevent the contents from communicating with the environment. The sealing layer is heated and then severed. Subsequently, the container contents are communicated with the environment.

According to still another aspect of the invention, a method for opening a container which is sealed against the environment includes the step of providing a remote controlled means for severing a sealing layer of the container. An actuation signal is sent to the means for severing and the sealing layer is then severed. Subsequently, the container contents are communicated with the environment.

One advantage of the present invention is the provision of a new and improved filtering assembly which can be selectively exposed to the environment.

Another advantage of the present invention is the provision of a package encased in a cover means wherein the cover means is openable by a remotely activated means.

Still another advantage of the present invention is the provision of a covered filter cartridge which can be housed in a relatively inaccessible location and can be exposed to the environment by remote control such that the housing in which the filter cartridge is located does not have to be disassembled in order to remove the covering on the filter cartridge.

Yet another advantage of the present invention is the provision of a package having a covering means which is heat severable to allow the contents of the package to communicate with the environment.

Still other benefits and advantages of the invention will become apparent to those skilled in the art upon a reading and understanding of the following detailed specification.

Brief Description of the Drawings

The invention may take form in certain parts and arrangements of parts, preferred embodiments of which will be described in detail in this specification and illustrated in the accompanying drawings which form a part hereof and wherein.

Detailed Description of the Preferred Embodiments

Figure 3:
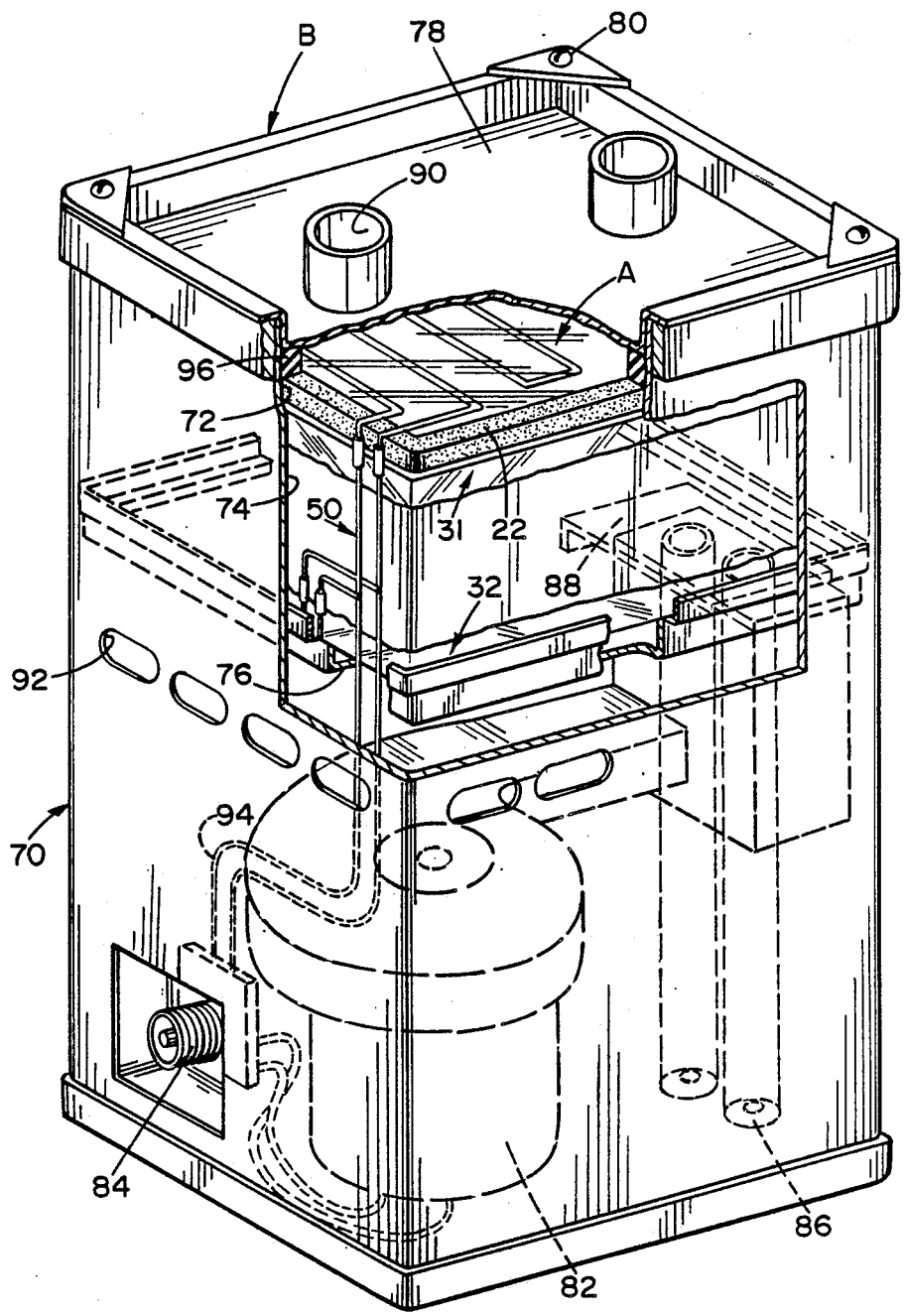
FIG. 3 is a perspective, partially broken away view of the filtering assembly of FIG. 1 housed in an emergency breathing apparatus.

Referring now to the drawings, wherein the showings are for purposes of illustrating preferred embodiments of the invention only and not for purposes of limiting same, FIG. 3 shows the subject new invention in use on a filtering assembly A that is housed in an emergency breathing apparatus B. While the filtering assembly is primarily designed for and will hereinafter be described in connection with the filtering of air for breathing, it should be appreciated that the overall inventive concept of a remotely activated means for severing a covering means on a package and of a heat severing means for a package cover material which are disclosed herein could also be adapted for use in many environments outside the field of filtering cartridges or containers.

Figure 1:
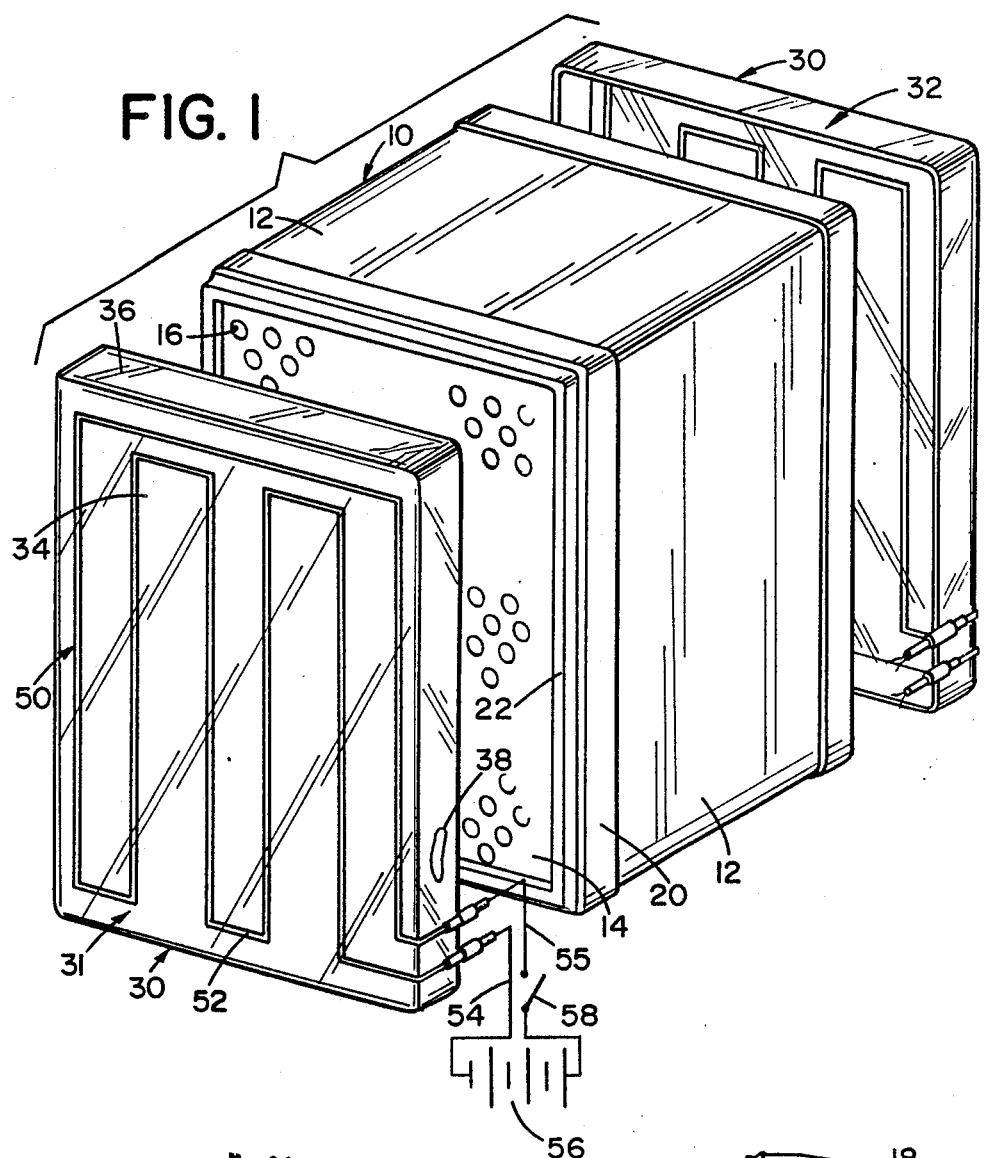
FIG. 1 is an exploded perspective view of a filtering assembly according to a first preferred embodiment of the present invention.

More particularly and with reference now to FIG. 1, the filtering assembly includes a support body 10 comprised of a plurality of side walls 12 as well as top and bottom end walls 14 (only one of which can be seen in FIG. 1). A plurality of perforations 16 are located in the end walls to allow fluid to pass therethrough. A filtering medium 18 is held within the support frame 10 as is more evident from FIGS. 2A and 2B. The end walls 14 are each held in a respective frame 20 which fits over the side walls 12 of the support body 10. A seal 22 is provided on the frame 20 around the edges of the end walls 14 in order to enable the support body 10 to sealingly fit within an aperture of the breathing apparatus.

A cover means 30 seals the end walls 14 against communication with the environment. The cover means can comprise a pair of separated plastic cover layers 31, 32 as is illustrated in FIG. 1. However, it should be recognized that the covering means can be made from materials other than plastic and that a covering layer completely enclosing the support frame 10 may also be provided if desired.

As shown in FIG. 1, the layers 31,32 are identical. For this reason, only layer 31 will be described in detail herein, it being recognized that the layer 32 has the identical configuration. Layer 31 includes an end wall 34, which extends over one end wall 14 of the support body 10 to cover all of the perforations 16 therein, as well as a depending skirt 36 which extends partially over the side walls 12 of the body 10. An adhesive layer 38 can be provided in the form of a bead along the length of the skirt on the inner wall thereof (only a portion of which is illustrated in FIG. 1 for the sake of simplicity) so that it can help adhere the layer 31 to the frame 20 which supports the perforated end wall 14.

Figure 2A:
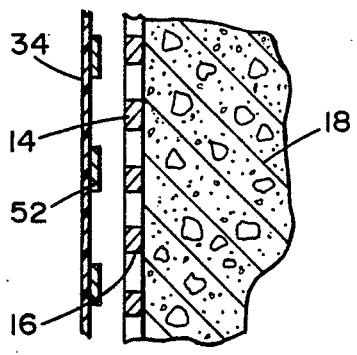
FIG. 2A is an enlarged cross sectional view through a portion of the filtering assembly of FIG. 1 presented in an assembled condition prior to the opening of a covering means.

A means for opening the cover means 30 is indicated by the numeral 50. The means for opening is remote controlled so that it can be actuated from a distance and can comprise an electrically conductive layer which can be made of a metallic foil, a conductive polymer or a conductive paint. In the embodiment of FIG. 1, the means for opening comprises a foil strip 52, made of a suitable conventional metal foil such as aluminum or copper, which is suitably adhered to a surface of the layer 31. The surface can be an inner surface if desired as is illustrated in FIG. 2A. The foil strip 52 can be provided in a race track pattern, a zig-zag pattern, or any other suitable desired pattern. A pair of wires 54,55 communicates the foil strip 52 with a suitable power means 56 such as the battery illustrated in schematic form in FIG. 1. A suitable switch means 58 is preferably provided to control the actuation of the means for opening 50. The switch means 58 can be located remotely from the body 10 so that a remote controlled means for opening the cover means 30 is provided.

Figure 2B:
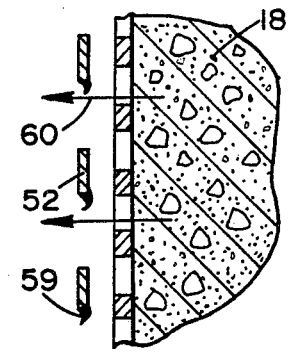
FIG. 2B is identical to FIG. 2A except that is shows the filtering assembly after the opening of the covering means.

With reference now to FIG. 2B, when electricity is delivered from the battery 56 to the remote controlled means for opening 50 after the switch means 58 is tripped, the foil strip 52 is heated due to the resistance of the foil to the passage of electricity therethrough. This will heat and eventually melt the plastic thereby severing the cover means 30. Thus, a means for heat severing the cover means 30 is provided. The melted plastic will in this embodiment be made of a suitable conventional material that will shrink and adhere to the adjacent foil as a "blob" 59 in order to open the filter assembly to communication with the environment.

It is recognized that only certain conventional plastics would be suitable for this type of filtration application since it is essential that no noxious fumes be produced during the melting of the plastic. However, several non-toxic types of conventional plastic materials are available for this purpose. Among these materials are ethylmethacrylate which melts at approximately 62° C. and polymethylmethocrylate which melts at approximately 100° C. Other suitable plastics could be low molecular weight polyethylene or polypropylene.

Air can now flow through the filtering medium 18 as is illustrated by arrows 60. After the plastic cover is melted, the foil strip 52 and the adjacent blob 59 can fall against the adjacent wall surface 14 or can continue to be spaced therefrom depending on the particular configuration of the strip. Since electricity is no longer needed, the battery or other suitable source of electricity can at this time be disconnected from the foil strip, such as by use of the switch means 58.

With reference now to FIG. 3, a housing 70 of the breathing apparatus B includes a top opening 72 and a recess 74 which is defined between the top opening and an intermediate plate 76 for receipt of the filtering assembly A. A cover plate 78, secured by suitable conventional fasteners 80, encloses the recess 74 and seals the filtering assembly A against communication with the environment except through suitable apertures in the apparatus B. Provided below the intermediate plate 76 is a suitable conventional fan 82 which is powered through a quick connect power plug 84 located on an outer periphery of the apparatus housing 70. The fan 82 communicates with the environment through slots 92 to withdraw air from the environment and send it to a pair of cyclone separator cylinders 86 which will remove larger dirt particles and send the air to the recess 74. The dirt particles are expelled by the separators through small apertures provided on the bottom faces of the cylinders 86. A diffuser plate 88 sits atop the outlets of the cylinders 86 to diffuse the air which is transmitted by the fan along the entire bottom surface of the filtering assembly A. After the air is filtered by the assembly A it is withdrawn through suitable outlets 90 provided in the cover plate 78.

Another way of powering the means for opening 50 of the filtering assembly A is to provide suitable wiring 94 leading from the power plug 84 to the foil strips of the means for opening as is illustrated in FIG. 3. In this way, when the fan 82 is powered, power is also provided to the foil strips to enable them to melt the plastic cover means first and second layers 31 and 3 and thereby open the filtering assembly A to allow it to filter air passing therethrough.

It is noted that the seal elements 22 provided on the top and bottom walls of the filtering assembly are to some extent compressed in their housing in the recess 74 by cooperation with a suitable seal strip 96 adhered to a bottom face of the top plate 78 around the periphery thereof in order to enable them to maintain a gas tight compression seal with respect to the breathing apparatus recess. This prevents the air which exits the diffuser plate 88 from seeping around the edges of the support frame between it and the walls of the housing 70. Such air would be very disadvantageous since it would not be filtered and the harmful elements therein would not be scrubbed therefrom. It is noted that although the seal elements 22 are covered by the plastic layers 31, 32 if a suitably large compression is provided on the seal elements, they will maintain a sealing contact with the housing 70 to prevent a seepage of air.

Figure 4:
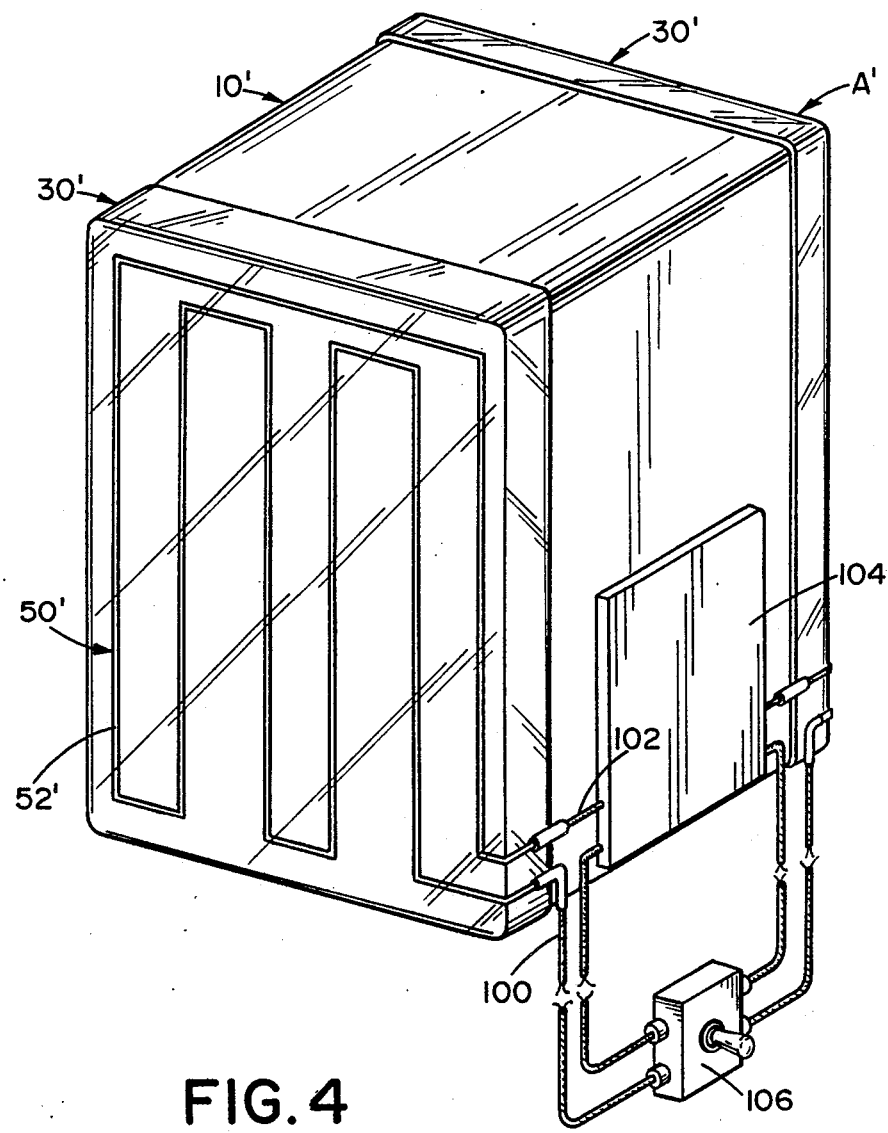
FIG. 4 is a perspective view of a second preferred embodiment of the filtering assembly according to the present invention.

With reference now to the second preferred embodiment of FIG. 4, the invention is there shown with a different arrangement for electrical power. For ease of illustration and appreciation of this alternative, like components are identified by like numerals with a primed (') suffix and new components are identified by new numerals.

In FIG. 4, a filtering assembly A' includes a support frame 10' which is provided with a cover means 30'and a means for opening 50'. The means for opening comprises a race track foil strip 52' which is connected by suitable wiring 100,102 to both a battery 104 secured in a suitable manner to the support frame 10' and to a remote switch means 106 which can be positioned outside of whatever housing the filtering assembly A' is placed in. In this way, when it is desired to open the filtering assembly to communication with the environment, one need merely to trip the switch means which will provide the power from the battery 100 to the foil strip 52' thereby melting the plastic in the cover means 30'.

Figure 5A:
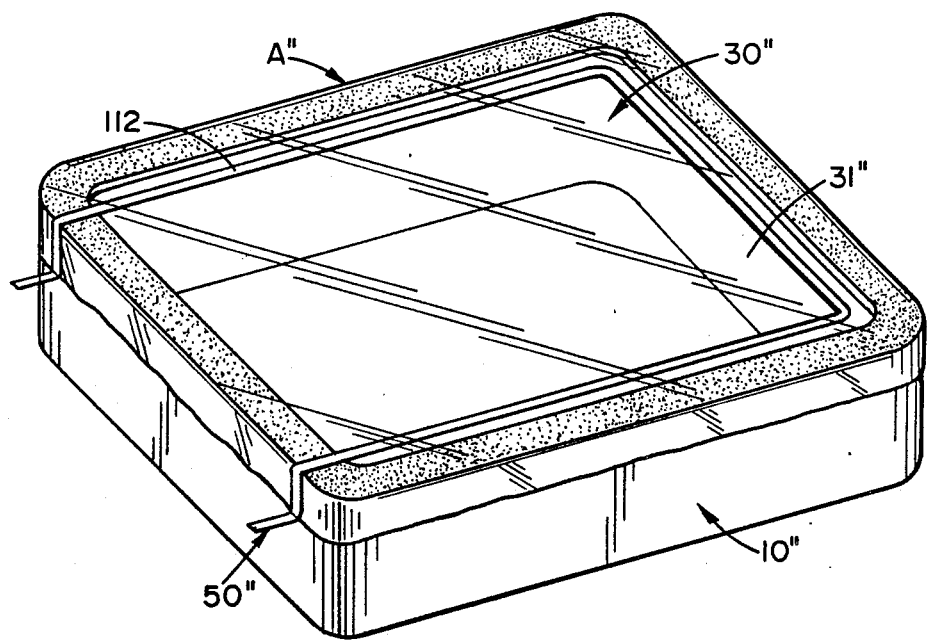
FIG. 5A is a perspective view of a portion of a filtering assembly according to a third preferred embodiment of the present invention prior to the opening of the assembly.
Figure 5B:
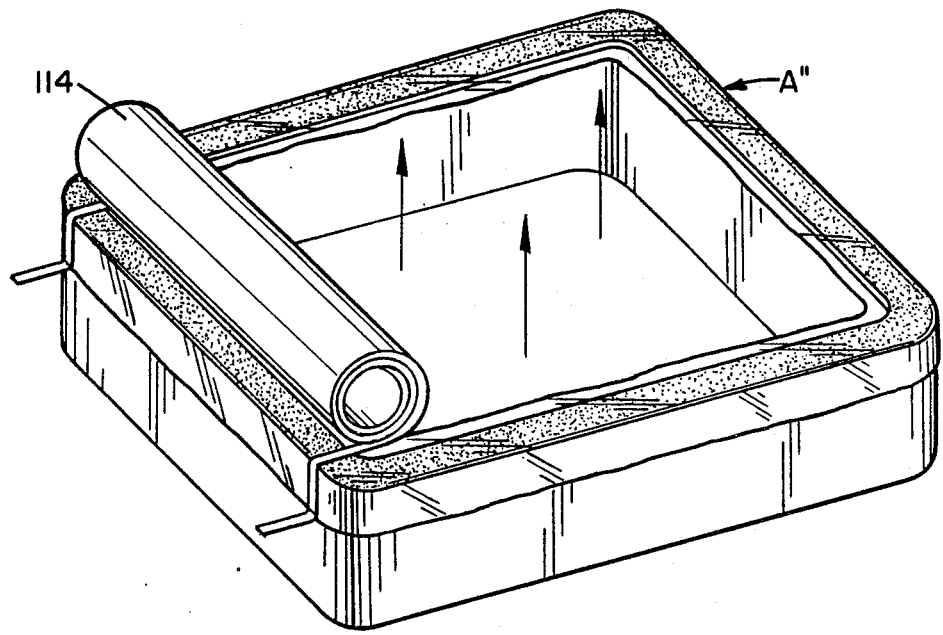
FIG. 5B is a perspective view which illustrates the filtering assembly of FIG. 5A after opening.

With reference now to the third preferred embodiment of FIGS. 5A and 5B, the invention is there shown with an opening means of a different configuration and a cover means having different characteristics. For ease of illustration and appreciation of this alternative, like components are identified by like numerals with a double primed (") suffix and new components are identified by new numerals.

In FIG. 5A is illustrated a section of a filtering assembly A" which includes a support frame 10" having thereon a cover means 30" as well as a means for opening 50". In this case, however, the means for opening comprises a U-shaped foil strip 112. When power is provided to this foil strip, the material of a cover means layer 31" adjacent thereto will be made of a suitable conventional material that will melt thereby causing a gap in the cover means. As illustrated in FIG. 5B, the material of the cover means which is secured to the frame 10" in this instance has a memory so that it rolls up as illustrated at 114 in FIG. 5B. This will allow air to stream through the filtering assembly A" when desired.

Figure 6A:
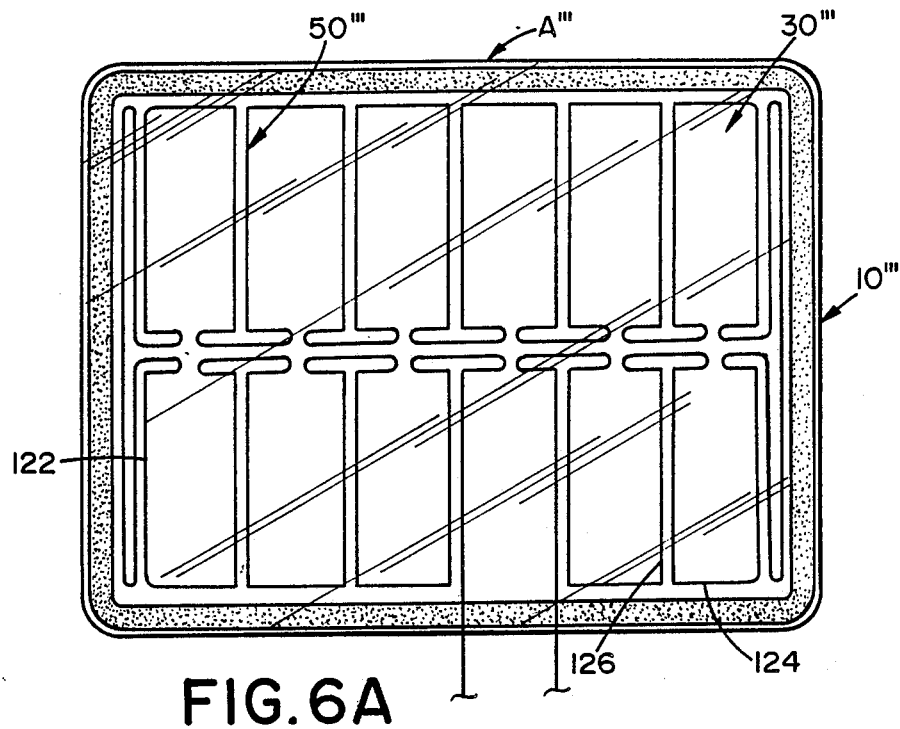
FIG. 6A is a top plan view of a filtering assembly according to a fourth preferred embodiment of the present invention prior to opening.
Figure 6B:
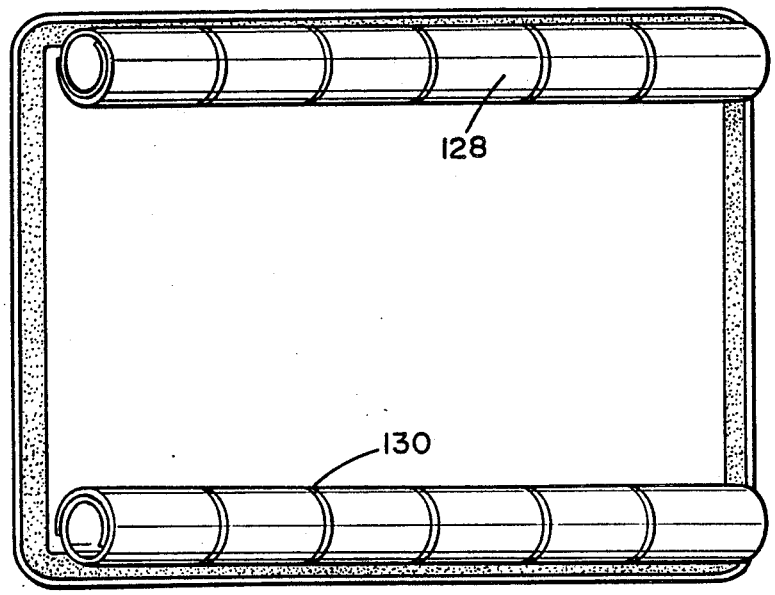
FIG. 6B is a top plan view which shows the filtering assembly of FIG. 6A after opening.

In FIGS. 6A and 6B is illustrated yet another preferred embodiment of the invention. For ease of illustration and appreciation of this alternative, like components are identified by like numerals with a triple primed ('") suffix and new components are identified by new numerals.

In FIG. 6A is illustrated a filtering assembly A'"- which comprises a support frame 10'" that has thereon a cover means 30'" and a means for opening 50'". In this embodiment, a foil strip 122 having a complex pattern comprises the means for opening 50'". The cover means 30'"and the foil strip means for opening cooperate in such a way that the foil transmits only enough power to melt the cover material between closely adjacent layers of foil strip. In other words, a single piece of foil strip as at 124 does not melt the cover material, whereas the cover material between the closely adjacent pair of foil strips as at 126 does melt. As illustrated in FIG. 6B, if the cover material is given a suitable memory it will curl up into discrete adjacent curled strips 128 after melting with a slot 130 between each two strips.

Figure 7A:
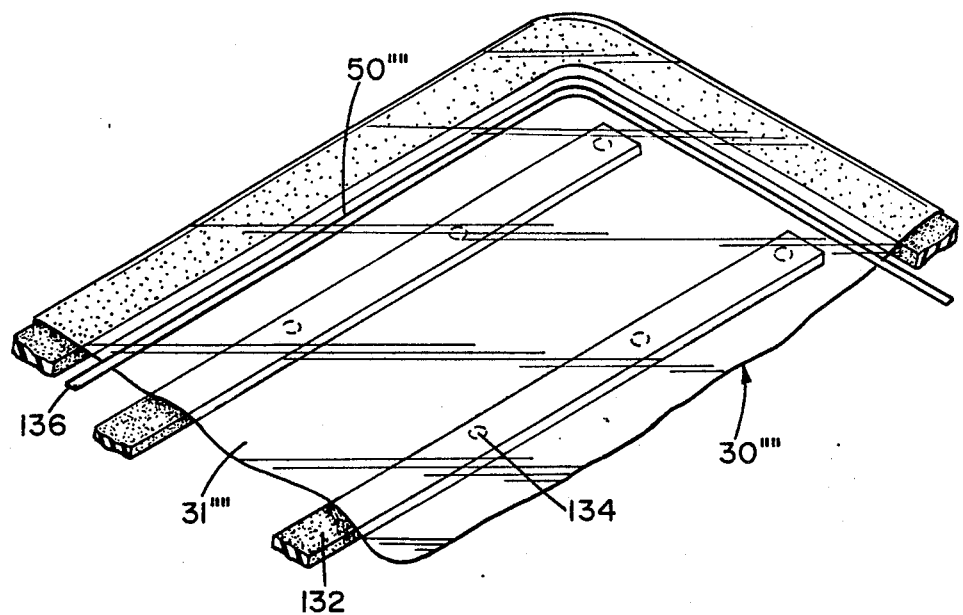
FIG. 7A is a perspective view of a portion of a filtering assembly covering means according to a fifth preferred embodiment of the present invention prior to the opening of a covering means.
Figure 7B:
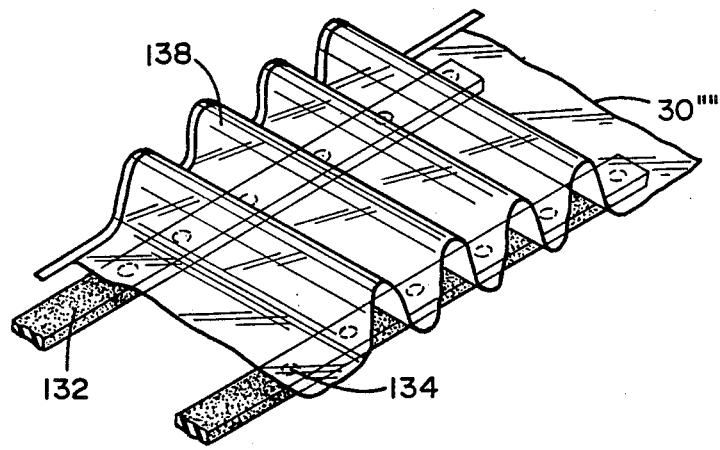
FIG. 7B is a perspective view which shows the covering means of FIG. 7A after opening.

FIGS. 7A and 7B illustrate an additional preferred embodiment of the invention. For ease of illustration and appreciation of this alternative, like components are identified by like numerals with a quadruple primed ('"") suffix and new components are identified by new numerals.

In this embodiment, a cover means 30'"" for a package is provided with at least one elastic band 132 which is secured at discrete points 134, as by a suitable discrete spots of adhesive, to a cover means layer 31'"" adjacent thereto. When a foil strip 136 of a means for opening 50'""is activated, it melts the cover means layer around its edges. This allows the elastic bands which are stretched and held in tension while the cover means is intact to retract the cover means into a series of adjacent ridges as at 138 thereby opening the package, as is illustrated in FIG. 7B.

Figures 8, 9, 10:
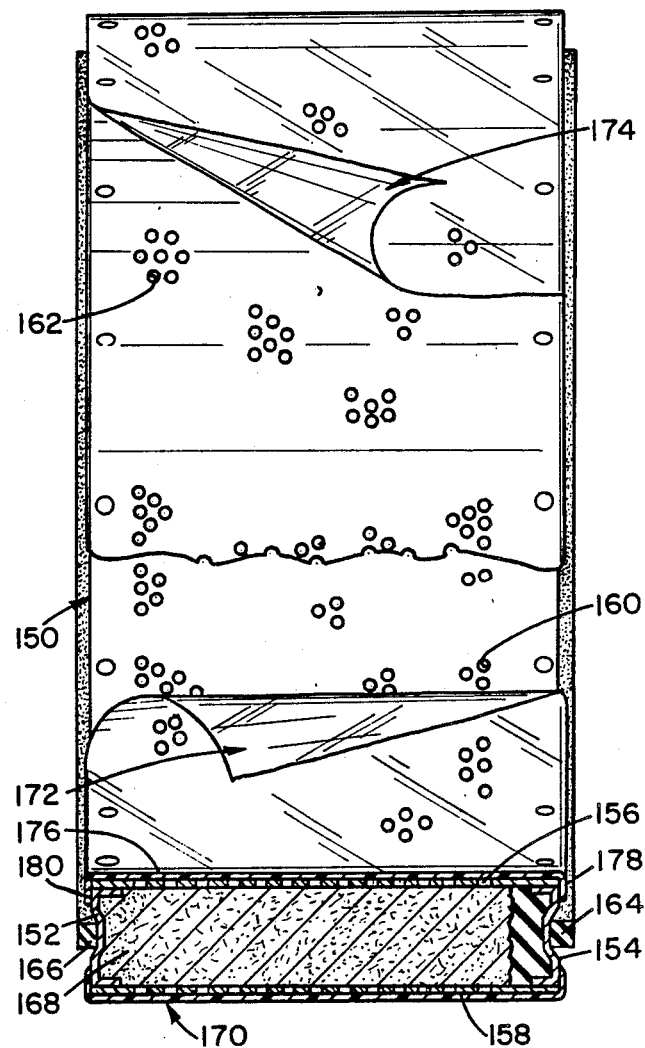
FIG. 8 is an end elevational view, partially in cross-section of a sixth preferred embodiment of the present invention.
FIG. 9 is a greatly enlarged cross-sectional view through a portion of a covering means of the embodiment of FIG. 8; and, FIG. 10 is a greatly enlarged cross-sectional view through a portion of an alternate covering means for the embodiment of FIG. 8.

FIGS. 8 and 9 illustrate yet an additional preferred embodiment of the invention in a different type of filter assembly. In this embodiment, the filtering assembly is toroidally shaped in contrast to the rectangular configuration illustrated in FIGS. 1–4. The assembly comprises a support frame 150 having first and second side walls 152, 154 as well as first and second end walls 156, 158. Each of the end walls is perforated with suitable perforations 160, 162. A respective seal member 164, 166 is provided on each of the side walls 152, 154. A filtering medium 168, such as activated charcoal, is held in the support frame 150. It should be appreciated that while activated charcoal is illustrated as being the preferred filtering medium, many other conventional types of filtering mediums could be provided instead, as required for a particular use.

A cover means 170 is provided over the first and second end walls 156, 158 in order to prevent communication of the filtering medium with the surrounding environment. The cover means comprises first and second cover layers 172, 174. However, it should be recognized that the cover means can be so constructed as to completely enclose the support frame 150 if that is desired. As is evident from FIG. 8, the cover layers 172, 174 are identical. For this reason, only cover layer 172 will be described in detail herein, it being recognized that the other cover layer 174 has the identical configuration. Layer 172 includes an end wall 176 which extends over the end wall 156 of the support frame to cover all the perforations therein as well as a depending skirt 178 which extends partially over the side walls 154, 156 of the support frame. Preferably, an adhesive 180 is provided in bead form along the length of the skirt on each side wall 152, 154 of the support frame in order to adhere the cover layer thereto.

With reference now to FIG. 9, the cover layer end wall 176 has adhered thereto by suitable means a means for opening 190. The means for opening can be an electrically conductive layer 192. While in the previous embodiments, the electrically conductive layer was described as a metallic foil, it should be appreciated that other types of electrically conductive layers can also be provided. For example FIG. 9 illustrates an electrically conductive layer that is made from a suitable conventional conductive polymer substance. If desired, however, the electrically conductive layer could also be suitable conventional conductive paint.

Alternatively, as is illustrated in FIG. 10, the cover layer and the means for opening thereof can be integral in the form of a single electrically conductive polymer layer 200. Recent research in polymers has identified several such polymer compositions. These include doped polyacetylene and polythiophene.

Thus, the subject invention provides a remotely actuated means for opening a cover on a package which cover prevents the package from communicating with the environment. The present invention also provides a heat severable sealing membrane or cover which is adapted to seal the contents of a package against communication with the surrounding environment. In the embodiments illustrated, the package contains a filtering material. It should be appreciated, however, that the package could contain a wide variety of other materials as well.

The invention has been described with reference to preferred embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is now claimed to be:

1. A selectively openable filtering assembly comprising:
   a filter means for treating a fluid passing therethrough;
   a housing in which said filter means is positioned, said housing having an inlet and an outlet;
   a cover for sealing said housing inlet and outlet thereby isolating said filter means from communication with the environment;
   a remotely activated means for severing said cover, said means for severing comprising an electrically conductive layer adhered to said cover; and
   a means for exposing said filter means to the environment after said cover is severed.

2. The assembly of claim 1 wherein said cover comprises a layer of a plastic material.

3. The assembly of claim 1 wherein said electrically conductive layer comprises a metallic foil strip.

4. The assembly of claim 1 wherein said cover means and said remotely activated means together comprise a conductive polymer material and a means for selectively providing electricity to said conductive polymer material.

5. The assembly of claim 1 wherein said housing includes a support frame for supporting said filtering medium.

6. The assembly of claim 5 wherein said support frame comprises four side walls as well as top and bottom end walls and wherein said support frame end walls are perforated, said housing inlet and outlet each comprising a respective one of said support frame end walls.

7. The assembly of claim 5 wherein said support frame is toroidally shaped and includes inner and outer end walls which are perforated.

8. The assembly of claim 1 wherein said means for severing further comprises a means for selectively providing electricity tro said electrically conductive layer.

9. The assembly of claim 8 wherein said cover means comprises a cover layer and a means for biasing said cover layer such that said cover layer rolls up after said electrically conductive layer melts an adjacent portion of said cover layer.

10. The assembly of claim 8 wherein said electrically conductive layer comprises a conductive polymer layer.

11. The assembly of claim 8 wherein said electrically conductive layer comprises a conductive paint layer.

12. An emergency air filtering apparatus comprising:
    a filter means for cleaning a contaminated air passing therethrough;
    a support container in which said filter means is held, said container having an inlet and an outlet opening;
    a cover for sealing said support container inlet and outlet thereby isolating said filter means against communication with the environment;
    a fan means for urging contaminated air through said filter means;
    a housing means for holding said support container, said cover, and said fan means; and,
    a remotely activated means for opening said cover and exposing said filter means to the environment when it is desired to use said filter means, said remotely activated means being electrically actuated in order to allow access to said cover without having to disassemble said housing means to obtain access to said support container and said filter means held therein.

13. The apparatus of claim 12 wherein said remotely activated means for opening and exposing comprises an electrically conductive layer which is secured to said cover which comprises a thermoplastic material, wherein when electricity is passed through said layer, said thermoplastic material is severed and shrivels up thereby creating at least one aperture in said cover to allow air to pass therethrough.

14. A filter cartridge for treating a fluid passing therethrough, said cartridge comprising:
    a filtering medium;
    a support container for holding said filtering medium, said support container having inlet and outlet openings;
    a cover means for sealing said support container inlet and outlet openings in order to isolate said filtering medium from communication with the environment, said cover means comprising a thermoplastic layer; and,
    a heat severing means for opening said cover means and shriveling up said thermoplastic layer in order to expose said filtering medium to the environment when it is desired to use the filter cartridge.

15. The cartridge of claim 14 wherein said support container comprises solid side walls and perforated end walls, wherein said end walls are perforated to allow the communication of said filtering medium with the environment.

16. The cartridge of claim 14 wherein said heat severing means comprises:
    an electrically conductive layer which is secured to said cover means; and,
    a source of electricity for said layer, wherein when electricity is passed through said layer, said cover means is melted thereby creating at least one aperture in said cover means to allow a fluid to pass therethrough.

17. The cartridge of claim 14 wherein said cover means comprises a layer of material and a means for biasing said layer of material such that said material will roll up after said electrically actuated means for opening said cover means is actuated.

18. A remotely openable assembly comprising:
    a container having contents;
    a cover means for sealing said container contents against communication with the surrounding environment, said cover means comprising a layer of a thermoplastic material; and,
    a remotely activated means for opening said cover means for allowing said container contents to communicate with the surrounding environment, wherein said remotely activated means comprises a means for generating heat to sever said layer of thermoplastic material, after which said material shrivels up in order to expose said container contents to the surrounding environment.

19. The assembly of claim 18 wherein said remotely activated means comprises:

an electrically conductive layer which is secured to said cover means; and, a source of electricity for said layer, wherein when electricity is passed through said layer, said cover means is severed thereby creating at least one aperture in said cover means.

20. The assembly of claim 19 wherein said electrically conductive layer is made of a material selected from the group consisting of metallic foils, conductive polymers and conductive paints.

21. A method for opening a container which is sealed against the environment, comprising the steps of:

providing a container having contents, said container having a sealing panel covering an opening thereon to prevent said container contents from communicating with the environment;

heating said sealing panel;

severing said sealing panel along at least one line into at least two portions;

at least partially removing said sealing panel at least two portions from said container opening; and subsequently communicating said contents of said container with the environment.

22. A method for opening a container which is sealed against the environment, comprising the steps of:

providing a container having contents, said container having a sealing panel covering an opening thereon to prevent said container contents from communicating with the environment;

providing a remote controlled means for severing said sealing panel;

sending an actuation signal to said means for severing;

severing said sealing panel along at least one line into at least two portions;

at least partially removing said sealing panel at least two portions from said container opening; and, subsequently communicating said contents of said container with the environment.

* * * * *